US 6,715,913 B2

(12) United States Patent  
Engel

(10) Patent No.: US 6,715,913 B2
(45) Date of Patent: Apr. 6, 2004

(54) SHAFT BEARING SUPPORT METHOD AND APPARATUS

(75) Inventor: David Engel, Springwater, NY (US)

(73) Assignee: SPX Corporation, Charlotte, NC (US)

( * ) Notice: Subject to any disclaimer, the term of this patent is extended or adjusted under 35 U.S.C. 154(b) by 117 days.

(21) Appl. No.: 10/120,448

(22) Filed: Apr. 12, 2002

(65) Prior Publication Data

US 2003/0185097 A1 Oct. 2, 2003

Related U.S. Application Data

(60) Provisional application No. 60/368,159, filed on Mar. 29, 2002.

(51) Int. Cl.[7] ............................................. B01F 15/00
(52) U.S. Cl. ........................................................ 366/331
(58) Field of Search ................... 366/262, 270, 366/331; 416/174; 384/548, 551; 464/178, 180

(56) References Cited

U.S. PATENT DOCUMENTS

| RE14,249 | E | * | 1/1917 | Besserdich | |
|---|---|---|---|---|---|
| 1,687,806 | A | * | 10/1928 | Strong | 384/480 |
| 2,034,545 | A | * | 3/1936 | Umstattd | 384/571 |
| 2,332,684 | A | * | 10/1943 | Armitage | 384/584 |
| 2,341,981 | A | * | 2/1944 | Davids | 464/99 |
| 2,612,391 | A | * | 9/1952 | Boutros | 384/489 |
| 2,627,171 | A | * | 2/1953 | Brumagim | 464/178 |
| 2,753,161 | A | * | 7/1956 | Fye | 366/330.7 |
| 2,867,997 | A | * | 1/1959 | Lake | 464/178 |
| 2,895,315 | A | * | 7/1959 | Fishtahler | 464/52 |
| 3,290,897 | A | | 12/1966 | Kuehn | |
| 3,405,980 | A | * | 10/1968 | Stonebraker | 384/584 |
| 3,606,260 | A | * | 9/1971 | Rubin | 366/330.1 |
| 3,813,826 | A | * | 6/1974 | Bando | 451/342 |
| 3,887,169 | A | * | 6/1975 | Maynard | 366/307 |
| 3,911,550 | A | * | 10/1975 | Gilman | 29/426.1 |
| 3,912,345 | A | * | 10/1975 | Overton | 384/584 |
| 4,198,373 | A | * | 4/1980 | Kropp et al. | 422/49 |
| 4,411,346 | A | * | 10/1983 | Witt | 192/85 A |
| 4,424,840 | A | * | 1/1984 | Pousette et al. | 144/248.5 |
| 4,813,786 | A | | 3/1989 | LeMaster | |
| 4,850,723 | A | | 7/1989 | Whitemaster, Jr. | |
| 4,993,529 | A | * | 2/1991 | Leigh-Monstevens et al. | 192/85 CA |
| 5,022,821 | A | * | 6/1991 | Isert | 416/167 |
| 5,049,013 | A | * | 9/1991 | Engles et al. | 409/231 |
| 5,094,542 | A | * | 3/1992 | Engels et al. | 366/282 |
| 5,267,914 | A | * | 12/1993 | Eastman et al. | 475/221 |
| 5,328,275 | A | * | 7/1994 | Winn et al. | 384/472 |
| 5,368,390 | A | * | 11/1994 | Gambrill et al. | 366/273 |
| 5,427,450 | A | * | 6/1995 | Gambrill | 366/168.1 |
| 5,560,709 | A | * | 10/1996 | Hutchings et al. | 366/331 |
| 5,568,975 | A | * | 10/1996 | Blakley et al. | 366/285 |

(List continued on next page.)

FOREIGN PATENT DOCUMENTS

| EP | 0222933 | * | 5/1987 |
| EP | 1 180 320 | | 2/2002 |
| GB | 889590 | | 2/1962 |
| JP | 57149617 | | 9/1982 |
| WO | 94/27055 | * | 11/1994 |

OTHER PUBLICATIONS

Copy of a Lightnin sales brochure dated Apr. 1, 1996.
International Searching Authority, International Search Report dated Jul. 21, 2003.

Primary Examiner—Charles E. Cooley
(74) Attorney, Agent, or Firm—Baker & Hostetler LLP

(57) ABSTRACT

An assembly for supporting a rotatable shaft assembly of mixers and similar rotating equipment that includes a first bearing set and a second bearing set. The first and second bearing sets surround and support the rotatable shaft assembly at respective axial locations.

19 Claims, 3 Drawing Sheets

U.S. PATENT DOCUMENTS

| | | | |
|---|---|---|---|
| 5,585,124 A | * 12/1996 | Bittner | 425/331 |
| 5,667,313 A | * 9/1997 | Kapaan et al. | 384/544 |
| 5,720,486 A | 2/1998 | Hutchings et al. | |
| 5,746,536 A | * 5/1998 | Hutchings et al. | 403/370 |
| 5,876,127 A | * 3/1999 | Casey | 384/538 |
| 5,890,813 A | * 4/1999 | Kasai et al. | 384/484 |
| 6,293,704 B1 | * 9/2001 | Gradu | 384/557 |
| 6,327,773 B1 | * 12/2001 | Rode | 29/724 |
| 2002/0181325 A1 | * 12/2002 | Engel | 366/331 |

* cited by examiner

SHAFT BEARING SUPPORT METHOD AND APPARATUS

PRIORITY

This application claims priority to the provisional U.S. patent application entitled, SHAFT BEARING SUPPORT METHOD AND APPARATUS, filed Mar. 29, 2002, having a serial No. 60/368,159, the disclosure of which is hereby incorporated by reference.

FIELD OF THE INVENTION

The present invention relates generally to methods and apparatuses for the support of rotating cylindrical shafts with bearings in mixers and mixing systems. More particularly, the present invention relates to apparatuses and methods that provide independent bearing support to a driven mixer impeller shaft arrangement having a quill shaft coupled to another shaft. The invention is useful, for example, for providing axial and radial support, in an economical and efficient manner, to such a rotating cylindrical shaft arrangement.

BACKGROUND OF THE INVENTION

In material processing equipment such as mixers, it is common that a rotatable shaft assembly is supported by spherical and/or tapered bearing support rings. This support is commonly accomplished by placing the spherical bearing support rings at various axial locations along the rotatable shaft. In a typical mixer assembly, the rotatable shaft assembly includes two shafts coupled to one another: (1) an output impeller drive shaft that extends into the mixing vessel to drive an impeller, and (2) a hollow quill shaft that encircles a portion of the output shaft, is rotationally coupled to the output shaft, and has a gear that is driven by the drive assembly of the mixer. The aforementioned shafts are typically supported by two distinct bearing types. The first type are often referred to as independent support bearings, and are typically employed to support the output shaft of the mixer. The second type of bearing is utilized to support the quill shaft. During mixer operation, the output shaft is introduced to high load and bending forces due to the various mixing conditions. These conditions include, for example, the shaft speed, the physical properties of the materials to be mixed, and the shaft length. These forces translate into bending forces which cause the rotatable shaft to deflect radially. The use of two sets of bearings and the two shafts enables the quill shaft to be isolated from the output shaft and the associated bending loads the output shaft experiences during mixer operation. This prevents or inhibits the quill shaft from transmitting these undesirable loads to the drive assembly.

Known mixer bearing support assemblies typically employ a combination of spherical and tapered bearing support rings. The independent support bearings support the output shaft and are designated to encounter the bending loads of the output shaft while the shaft is rotating. These bearings are usually large spherical bearing support rings so that they can handle the various reaction loads exerted on the output shaft during mixer operation. Due to the bearings' size, standard mixers must be arranged to accommodate the bearings, for example, by employing large pedestals and/or frame assemblies. The bearings that contact and support the quill shaft are usually tapered.

In addition, the bearing housings of the frame assembly which house each of the bearing rings commonly are separate components that are mounted on the mixer frame assembly. Many times the housings are mounted in such a way that the bearing bores of the individual bearings that make up the pair are not accurately aligned with one another. This can result in misalignment between the output shaft and the quill shaft.

Current methods to address shaft deflection and the loads exerted on the shaft involve employing significantly large support bearings, however these arrangements have drawbacks. For example, the utilization of large independent support bearings requires that the mixer housings within which the bearings are housed to be larger, increasing the overall size of the mixer frame and therefore increasing cost. Even though large spherical bearings are employed, the output shaft still may experience undesirable deflection due to large bearing span. As a result of these large axial distances between the independent bearings, flexible couplings may be employed to compensate for shaft tilting and/or bending. However, flexible couplings utilize many components and can be very expensive, and therefore eliminating them can be desirable In view of the foregoing, it is desirable to provide a method and apparatus for effectuating a suitably rigid, bearing support of a rotatable shaft assembly. It is also desirable to provide a method and apparatus for bearing support that can react the bending loads. It is further desirable to effectuate a suitably rigid, independent bearing support that can react the bending loads at a reduced cost.

SUMMARY OF THE INVENTION

It is an object of the present invention to provide and improved bearing assembly and method that can support a rotatable shaft and react to bending loads and/or provide improved radial and axial load handling capability at a reduced cost.

The foregoing needs are met, to a great extent, by the present invention where, in one aspect, an assembly is provided for supporting a rotatable shaft of a mixing apparatus having a first housing affixed to the mixing apparatus wherein a first bearing is mounted. The first bearing surrounds and supports the rotatable shaft at a first axial location. The assembly additionally has a second bearing mounted on the first housing that surrounds and supports the rotatable shaft at a second axial location.

In accordance with another aspect of the present invention, the support assembly includes a first housing affixed to the mixing apparatus having a first bearing mounted thereto and a second bearing mounted thereto. Both the first and second bearings support and surround the rotatable shaft at respective first and second axial locations. The assembly additionally includes a second housing affixed to the mixing apparatus having a third and fourth bearing mounted thereto. Both the third and fourth bearings support and surround the rotatable shaft at respective third and fourth axial locations. The aforementioned bearings combine to support a rotatable shaft having a first shaft disposed within and coupled to, a second hollow shaft.

In accordance with yet another aspect of the present invention, a method for supporting a rotatable shaft is provided, wherein a first bearing is disposed within a speed reducer and a second bearing is disposed within the speed reducer. The bearings combine to support the rotatable shaft at a first and a second location along the length of the rotatable shaft to resist axial, radial, and bending loads on the shaft.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides a cost effective method and apparatus for supporting a rotatable shaft assembly. The apparatus is preferably used in conjunction with a rotating mixer impeller shaft and is suitable for providing support during mixer operation. In some embodiments the independent support bearings are disposed in close proximity to their corresponding quill shaft bearings, which helps in limiting shaft deflection and can eliminate the need for a flexible coupling. In some embodiments, the independent support bearings and/or the quill shaft bearings are tapered roller bearings.

The apparatus is preferably disposed within a gearbox and/or speed reducer of the mixer apparatus. In the embodiments depicted, the bearing assembly is utilized in combination with an industrial mixer and is shown supporting shafts having a vertical axis typical of top-entering mixers. It should be understood, however, that the present invention is not limited in its application to industrial mixers, but, for example, can be used with other devices having shafts, and is also not limited in its use to top-entering mixers, but can be used, for example, with bottom-entering or side entering mixers. The invention is also suitable for horizontal or angled shaft orientations.

Figure 1:
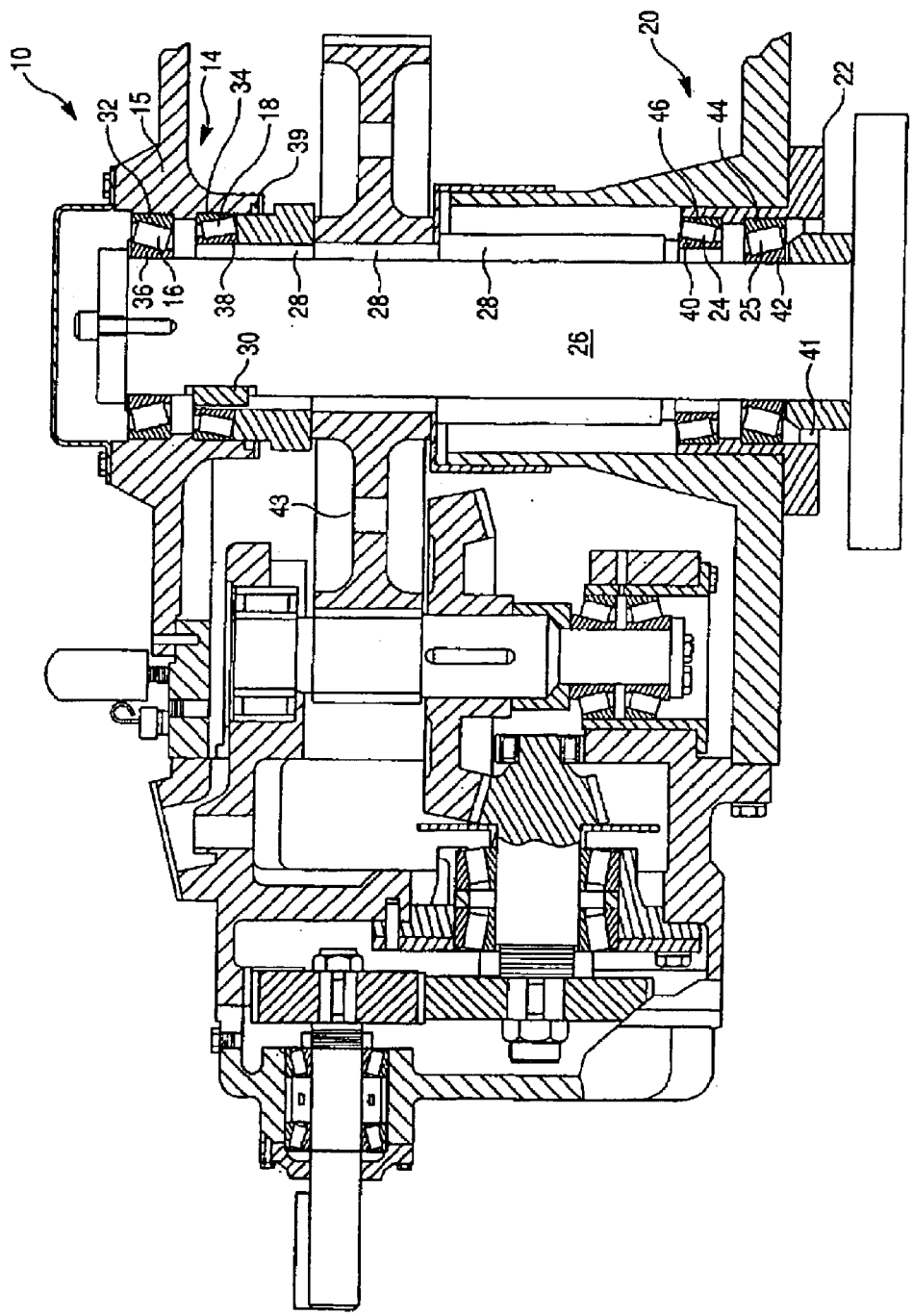
FIG. 1 is a cross-sectional side view of a bearing assembly in accordance with a first embodiment of the present invention.
Figure 2:
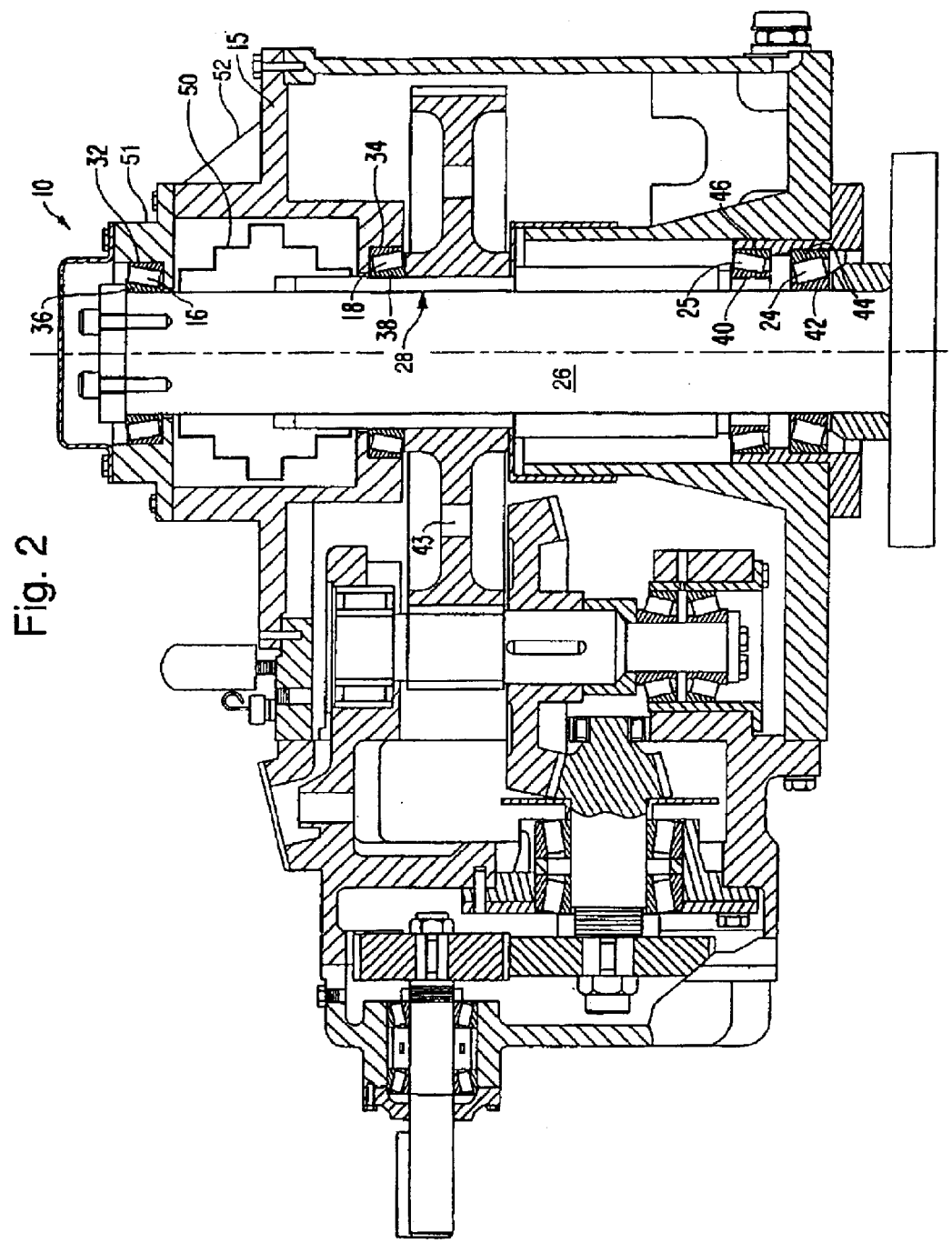
FIG. 2 is a cross-sectional side view of a second embodiment of the present invention.

More specifically, referring now to the figures wherein like reference numerals indicate like elements, FIGS. 1–2 illustrate presently preferred embodiment of a bearing support assembly 10 in accordance with a preferred embodiment of the invention. As shown in FIGS. 1–2, the bearing assembly 10. The assembly 10 includes a first bearing assembly 14 having a bearing housing 15 upon which a first output shaft support bearing 16 is retained and upon which a first quill shaft bearing 18 is retained. The assembly 10 further includes a second bearing system 20 having a second bearing housing 22 upon which a second output shaft support bearing 25 and a second quill shaft support bearing 24 are retained. The assembly 10 supports a rotatable shaft assembly having an output shaft 26 that is surrounded by and coupled to a hollow outer shaft 28, referred to as a quill shaft. The quill shaft 28 is a single shaft having five regions with varying diameters each labeled 28. The quill shaft 28 is coupled to the output shaft 26 by a key 30 which transfers torque from the quill shaft 28 to the output shaft 26. This permits a radial space to be designed between the outer diameter of the output shaft 26 and the inner diameter of the quill shaft 28. This radial space assists in the isolation of the quill shaft 28 from the output shaft and its associated bending and/or vibration.

As depicted, the first bearing system 14 includes the bearing housing 15 which is also a portion of the speed reducer frame assembly. Preferably, the housing 15 is integral with the speed reducer frame. However, it can be a separate piece affixed to the speed reducer frame by any affixing means. The outer races 32, 34 of the first support bearing 16 and the first quill bearing 18, respectively, are fixedly supported by the housing 15.

The bearing housing 15 is preferably machined as a monolistic, single piece, component, affording aligned support surfaces contacting the outer races 32, 34 of bearings 16, 18, so they are accurately aligned with one another. This alignment allows the bearings 16, 18 to be closely spaced to each other or their respective shafts, inhibiting the likelihood of contact between the two shafts 26, 28. The bearing housing 15 may alternatively not be monolithic and may include multiple components.

The inner races 36, 38 are fixedly disposed to the respective shafts that the individual bearings support. The inner race 36 of the support bearing 16 is disposed on the output shaft 26 and rotates with the shaft 26 during mixer operation. The inner race 38 of the quill bearing 18 is disposed on the quill shaft 28 and rotates with the quill shaft during mixer operation.

The second bearing system 20 includes a bearing housing 22 which is also a portion of the speed reducer frame assembly. The housing 22 may be integral with the reducer frame. However the portion can be a separate piece affixed to the reducer frame by any affixing means as illustrated. The outer races 44, 46 of the support bearing 25 and the quill bearing 24, respectively, are fixedly supported by the housing 22. The bearing housing 22 is preferably machined as a monolithic single piece, component, affording aligned support surfaces contacting the outer races 44, 46 of bearings 24, 25 so they are accurately aligned. This alignment allows the bearings 24, 25 to be closely spaced to each other on their respective shafts, inhibiting the likelihood of contact between the two shafts 26, 28. The housing 22 may alternatively not be monolithic and include multiple components.

The inner races 40, 42 are fixedly disposed to the respective shafts that the individual bearings support. The inner race 42 of the support bearing 25 is disposed on the output shaft 26 and rotates with the shaft 26 during mixer operation. The inner race 40 of the quill bearing 24 is disposed on the quill shaft 28 and rotates with the quill shaft during mixer operation.

In a preferred embodiment, the support bearings 16, 25 are tapered roller bearings that are indirectly mounted. As depicted in FIG. 1, the first support bearing 16 is a tapered roller bearing canted in an angular direction upwardly and away from the output shaft 26 while the second support bearing 25 is also a tapered roller bearing, but canted downwardly away from the output shaft 26. The angling of the support bearings 16, 25 opposite each other provides improved axial load handling and further assists in the resistance of bending along the length of the output shaft 26 between the bearings 16, 25. The above described geometry provides a desirable resistance against bending along the mixer shaft 26, particularly near the bearing locations.

Conversely, the quill bearings 18, 24 are tapered roller bearings that are directly mounted. As depicted in FIG. 1, the first quill bearing 18 is canted downwardly and away from the quill shaft 28 while the second quill bearing 24 is canted upwardly and away from the quill shaft 28. The angling of the quill bearings 18, 24 opposite each other provides improved radial and axial support of the quill shaft 28 during mixer operation.

The support bearings 16, 25 and the quill bearings 18, 24 are commercially available. Alternatively, where commercial products are not appropriate, from, for example, a geometry or materials standpoint, custom designs can be made.

Lubricating grease may be provided where appropriate to assist in lubricating the support bearings and quill bearings. For example, a grease seal 39 may be provided to retain the grease around the first support and quill bearings 16, 18. Similarly, another grease seal 41 may be provided to retain grease around the second support and quill bearings 24, 25.

While the illustrated embodiment depicts tapered bearings at specified angles to one another and their respective shafts, alternative embodiments and/or modifications having various geometries and angular orientations fall within the scope of the invention. For example, bearing assemblies may be disposed at different angles to the shafts or one another on mixing assemblies where the mixer set-up and/or mixer application dictates. Similarly, a mixer set-up or application may utilize other types of bearings or group the bearings in different arrangements such as grouping the support bearings together in one bearing system and grouping the quill bearings together in the other bearing system.

As illustrated in FIGS. 1 and 2, the quill shaft 28 is a single hollow shaft having multiple regions each with varying diameters. As depicted, the quill shaft comprises five regions of varying diameter. The quill shaft 28 is attached to a driven gear 43 of a speed reducer preferably by welded fabrication, but may be attached by any means known in the art, such as with set screws or bolts.

The quill shaft 28 both encapsulates the output shaft 26 and is coupled to the output shaft 26. The quill shaft encapsulates the output shaft 26 such that a clearance (ranging from approximately 0.020" to 0.030" in some embodiments) exists between the inner diameter of the quill shaft and the outer diameter of the output shaft 26. The dimension is given by way of example only. This clearance serves to isolate at least partially the quill shaft 28 from the bending loads the output shaft 26 experiences during mixer operation.

The quill shaft 28 is rotationally coupled to the output shaft 26, preferably utilizing a key 30. The key 30 rests in a slot in both shafts and functions to transfer torque, generated from the driven gear 43, from the quill shaft 28 to the output shaft 26. The key 30 is preferably square in cross-sectional shape, but it can be various other geometries such as circular.

Preferably, in some embodiments the axial placement of the slots within which the key 30 is inserted is in the same axial location as the first quill bearing 18. This location affords the radial load exerted on the output shaft 26 by the key 30 to be exerted directly in line with the radial support force exerted on the quill shaft by the bearing 18. This enables both the support force and the torque force to be transmitted at one axial point on the shaft 28, inhibiting the likelihood of exerting undesirable deflection load on the quill shaft 28.

In the depicted preferred embodiments, the present invention provides cost effective, improved resistance against axial, radial, and bending movement. The bearing systems can be disposed along the shaft desireably close to one another, preferably within the housing of the mixer speed reducer. The bearing systems 14, 20 may employ monolithic bearing housings that afford the respective bearings to be accurately aligned, limiting the shafts' motion relative to one another. Tapered roller bearings are utilized to enhance the axial and radial restraining performance of the systems. The combination of the aforementioned characteristics provides a support bearing assembly that can produce a suitably rigid shaft support at a lower cost.

Referring now to FIG. 2, a second embodiment of the invention is depicted. In the embodiment of FIG. 2 the quill shaft 28 is rotationally coupled to the output shaft 26 via a flexible coupling 50. The flexible coupling 50 is a commercially available coupling that transmits torque between the two shafts, and thus generally rotationally couples the shaft, while having resilient members that can to some extent, accommodate angular, axial, and radial misalignment between the two shafts being coupled. This embodiment requires that the upper support bearing 16 being longitudinally spaced from the upper quill shaft bearing 18 by a sufficient longitudinal axial distance for the flexible coupling 50 to be disposed therebetween. In the illustrated embodiment, this longitudinal spacing is great enough so that the upper housing 15 is actually comprised of two separately machined components 51 and 52 which are attached to each other by fasteners.

As described above, some embodiments of the present invention utilize tapered roller bearings for at least some of the bearing sets. It is preferred that both of the output shaft support bearings be tapered, which provides a great advantage of the prior art. One benefit from tapered roller bearings is that they are significantly less expensive than the previously used spherical bearings. Furthermore, the use of tapered roller bearings permits the bearings to be located axially closer together to each other than would be possible with spherical roller bearings. This provides another benefit, because the overall bearing housing arrangement can be made more compact. Another benefit of the ability to use a relatively short distance between the output shaft support bearing is the output shaft support bearings can be axially located near each other, and can thus be located very near or almost adjacent the quill shaft support bearing, as in the embodiment of FIG. 1. In the embodiment of FIG. 2 a greater distance is required between the output and quill shaft bearings at the top (for the flexible coupling 50) but the benefit of placing the output shaft support bearings and quill shaft bearings close together is still realized at the bottom location. Placing the bearings pairs close together provides for overall compactness, and further provides the ability to inexpensively and conveniently provide a monolithic housing structure according the adjacent pairs of bearings, within affordable and effective high degree of tolerance, because it is easier to machine to a relatively small accuracy on a single piece as compared to an assembled multi-part piece.

Figure 3:
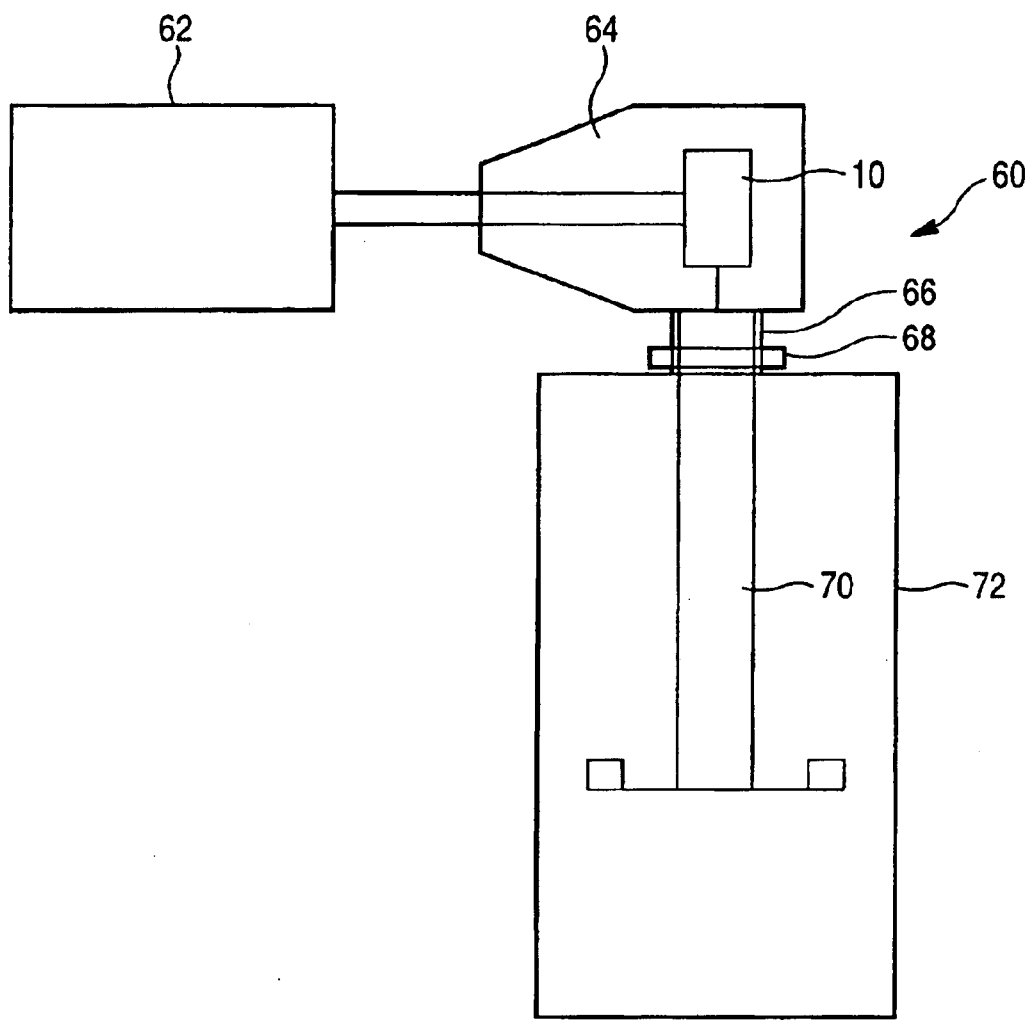
FIG. 3 is a schematic diagram of a mixer employing a bearing apparatus according to the present invention.

Referring now to FIG. 3, an industrial mixer 60 employing a bearing support apparatus 10 in accordance with the present invention is illustrated. The mixer 60 includes driving means 62 such as a turbine or motor connected to a speed reducer 64 within which the support apparatus 10 is disposed. The mixer 60 further includes a rotatable shaft 66 having a quill shaft and an output shaft terminating in a flange 68. The flange 68 provides connection to an impeller shaft 70 that extends into a mixing vessel 72.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An assembly for supporting a quill shaft around an impeller output drive shaft, arranged along a longitudinal axis, of a mixing apparatus, said assembly comprising:
    a housing assembly;
    a first tapered roller bearing mounted to said housing that supports and surrounds the output shaft at a first axial location thereof; and
    a second tapered roller bearing mounted to said housing that supports and surrounds the output shaft at a second axial location thereof,
    wherein the quill shaft and the output shaft are coupled together by a key such that a clearance exists between the outer diameter of the output shaft and the inner diameter of the quill shaft and wherein said key is placed at said equivalent axial position as said second bearing.

2. The assembly according to claim 1, further comprising:
    a third bearing mounted to said housing that supports and surrounds the quill shaft at a third axial location thereof; and
    a fourth bearing mounted to said housing that supports and surrounds the quill shaft at a fourth axial location thereof.

3. The assembly according to claim 2, wherein said third and fourth bearings are tapered roller bearings.

4. The assembly according to claim 2, wherein said first bearing is canted at a first angle relative to the axis; said second bearing is canted at a second angle relative to the axis; said third bearing is canted at a third angle relative to the axis; and said fourth bearing is canted at a fourth angle relative to the axis.

5. The assembly according to claim 4, wherein said first and said second angles are in opposite directions from each other and said third and said fourth angles are in opposite directions from each other.

6. The assembly according to claim 1, wherein said first tapered roller bearing and said second tapered roller bearing are disposed within a single compartment of the mixing apparatus.

7. The assembly according to claim 6, wherein said single compartment is a speed reducer.

8. An assembly for supporting a quill shaft around an impeller output drive shaft of a mixing apparatus, said assembly comprising:
    a first monolithic housing affixed to the mixing apparatus;
    a first bearing mounted to said first housing that supports and surrounds the quill shaft at a first axial location thereof; and
    a second bearing mounted to said first housing that supports and surrounds the output shaft at a second axial location thereof,
    wherein the quill shaft and the output shaft are coupled together by a key such that a clearance exists between the outer diameter of the output shaft and the inner diameter of the quill shaft, wherein said key is placed at said equivalent axial position as said second bearing.

9. The assembly according to claim 8, further comprising:
    a second monolithic housing affixed to the mixing apparatus;
    a third bearing mounted to said second housing that supports and surrounds the quill shaft at a third axial location thereof; and
    a fourth bearing mounted to said second housing that supports and surrounds the output shaft at a fourth axial location thereof.

10. The assembly according to claim 9, wherein said first bearing is a tapered roller bearing; said second bearing is a tapered roller bearing; said third bearing is a tapered roller bearing; and said fourth bearing is a tapered roller bearing.

11. The assembly according to claim 10, wherein said first bearing is canted at a first angle relative to an axis of the rotatable shaft; said second bearing is canted at a second angle relative to the axis of the rotatable shaft; said third bearing is canted at a third angle relative to the axis of the rotatable shaft; and said fourth bearing is canted at a fourth angle relative to the axis of the rotatable shaft.

12. The assembly according to claim 11, wherein said first and said second angles are in opposite directions from each other and said third and said fourth angles are in opposite directions from each other.

13. The assembly according to claim 9, wherein said first housing and said second housing are disposed within a single compartment of the mixing apparatus.

14. The assembly according to claim 13, wherein the single compartment is a speed reducer.

15. A method for supporting a quill shaft around an impeller output drive shaft comprising:
    surrounding and supporting the output shaft at a first axial location thereof utilizing a first tapered roller bearing mounted to a housing assembly; and
    surrounding and supporting the output shaft at a second axial location thereof utilizing a second tapered roller bearing mounted to the housing assembly,
    wherein the quill shaft and the output shaft are coupled together by a key such that a clearance exists between the outer diameter of the output shaft and the inner diameter of the quill shaft, wherein the key is placed at the equivalent axial position as the second tapered roller bearing.

16. The method according to claim 15, further comprising the steps of:
    surrounding and supporting the quill shaft at a third axial location thereof utilizing a third bearing; and
    surrounding and supporting the quill shaft at a fourth axial position thereof utilizing a fourth bearing.

17. The method according to claim 16, wherein the third and fourth bearings are tapered roller bearings.

18. A method for supporting a quill shaft around an impeller output drive shaft of a mixing apparatus comprising:
    surrounding and supporting the output shaft at a first axial location thereof utilizing a first bearing;
    surrounding and supporting the output shaft at a second axial location thereof utilizing a second bearing; and supporting the first and second bearings with a monolithic housing affixed to the mixing apparatus, wherein the quill shaft and the output shaft are counted together by a key such that a clearance exists between the outer diameter of the output shaft and the inner diameter of the quill shaft, wherein the key is placed at the equivalent axial position as the second bearing.

19. An assembly for supporting a quill shaft around an impeller output drive shaft, arranged along a longitudinal axis, of a mixing apparatus, said assembly comprising:

means for surrounding and supporting the output shaft at a first axial location thereof utilizing a first bearing;

means for surrounding and supporting the output shaft at a second axial location thereof utilizing a second bearing; and means for supporting the first and second bearings with a monolithic housing affixed to the mixing apparatus, wherein the quill shaft and the output shaft are coupled together by a means for coupling such that a clearance exists between the outer diameter of the output shaft and the inner diameter of the quill shaft, wherein said means for coupling is placed at the equivalent axial position as the second bearing.

* * * * *

UNITED STATES PATENT AND TRADEMARK OFFICE
CERTIFICATE OF CORRECTION

PATENT NO. : 6,715,913 B2
DATED : April 6, 2004
INVENTOR(S) : David Engel

It is certified that error appears in the above-identified patent and that said Letters Patent is hereby corrected as shown below:

Title page,
Item [57], ABSTRACT, replace with the following:
-- An assembly for supporting a quill shaft around an impeller output drive shaft. The assembly includes a housing assembly and a first tapered roller bearing mounted to the housing. The first tapered roller bearing supports and surrounds the output shaft at a first axial location thereof. The assembly also includes a second tapered roller bearing mounted to the housing. The second tapered roller bearing also supports and surrounds the output shaft at a second axial location thereof. --

Signed and Sealed this

Twelfth Day of April, 2005

JON W. DUDAS
*Director of the United States Patent and Trademark Office*